United States Patent
Haug et al.

(10) Patent No.: US 11,400,548 B2
(45) Date of Patent: Aug. 2, 2022

(54) METHODS AND LASER WELDING DEVICES FOR DEEP WELDING A WORKPIECE

(71) Applicant: TRUMPF Laser- und Systemtechnik GmbH, Ditzingen (DE)

(72) Inventors: Patrick Haug, Gerlingen (DE); Nicolai Speker, Pleidelsheim (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 508 days.

(21) Appl. No.: 16/407,411

(22) Filed: May 9, 2019

(65) Prior Publication Data

US 2019/0262942 A1 Aug. 29, 2019

Related U.S. Application Data

(63) Continuation of application No. PCT/EP2017/079071, filed on Nov. 13, 2017.

(30) Foreign Application Priority Data

Nov. 15, 2016 (DE) .................. 102016222357.7

(51) Int. Cl.
*B23K 26/06* (2014.01)
*B23K 26/24* (2014.01)
*B23K 26/242* (2014.01)

(52) U.S. Cl.
CPC ........ *B23K 26/242* (2015.10); *B23K 26/0608* (2013.01); *B23K 26/0613* (2013.01)

(58) Field of Classification Search
CPC ..... B23K 26/0604–0617; B23K 26/067–0673; B23K 26/0676; B23K 26/24–242
See application file for complete search history.

(56) References Cited

U.S. PATENT DOCUMENTS

| 6,444,947 B1 | 9/2002 | Bonss et al. |
| 7,807,939 B2 | 10/2010 | Nagashima et al. |

(Continued)

FOREIGN PATENT DOCUMENTS

| CN | 1785575 | 6/2006 |
| DE | 19637885 | 3/1997 |

(Continued)

OTHER PUBLICATIONS

English translation of JP2004154813 to Yoshihiko Matsuoka (Year: 2004).*

(Continued)

*Primary Examiner* — Michael A Laflame, Jr.
(74) *Attorney, Agent, or Firm* — Fish & Richardson P.C.

(57) ABSTRACT

The disclosure relates to methods and systems for deep welding a workpiece, a surface of the workpiece being irradiated by a first laser beam and a second laser beam. In a workpiece surface plane (OE) a first beam width B1 of the first laser beam is larger than a second beam width B2 of the second laser beam and in at least the workpiece surface plane (OE) the second laser beam lies inside the first laser beam. The intensity of the first laser beam alone is sufficient to produce a keyhole in the workpiece. The keyhole produced in the workpiece has a width KB in the workpiece surface plane (OE), KB substantially equaling B1, and B2≤0.75*KB. The methods and systems provide good seam quality, high penetration depth, and high welding speed.

22 Claims, 9 Drawing Sheets

(56) References Cited

U.S. PATENT DOCUMENTS

2006/0157457 A1 7/2006 Sakurai et al.
2016/0114428 A1* 4/2016 Wang ................... B23K 26/211
                                                427/554

FOREIGN PATENT DOCUMENTS

| | | | |
|---|---|---|---|
| DE | 197 51 195 | 4/1999 | ............ B23K 26/00 |
| DE | 199 33 825 | 2/2000 | ............ B23K 26/00 |
| DE | 198 59 243 | 7/2000 | ............ B23K 26/02 |
| DE | 102006011064 | 9/2007 | ............ B23K 26/06 |
| EP | 1 007 267 | 3/2006 | ............ B23K 26/00 |
| JP | S60-212710 | 10/1985 | |
| JP | 2001-166172 | 6/2001 | |
| JP | 2003-340582 | 12/2003 | ............ B23K 26/00 |
| JP | 2004-154813 | 6/2004 | ............ B23K 26/06 |
| JP | 2004-358521 | 12/2004 | ............ B23K 26/06 |
| JP | 2006-263771 | 10/2006 | ............ B23K 26/06 |
| JP | 2007-319878 | 12/2007 | ............ B23K 26/06 |
| JP | 4580065 | 11/2010 | ............ B23K 26/20 |

OTHER PUBLICATIONS

CN Office Action in Chinese Appln. No. 201780070456, dated Jul. 23, 2020, 16 pages (with English translation).
German Search Report for German Application No. DE 10 2016 222 357.7 dated Aug. 29, 2017.
International Search Report for International Application No. PCT/EP2017/079071 dated Apr. 5, 2018.

* cited by examiner

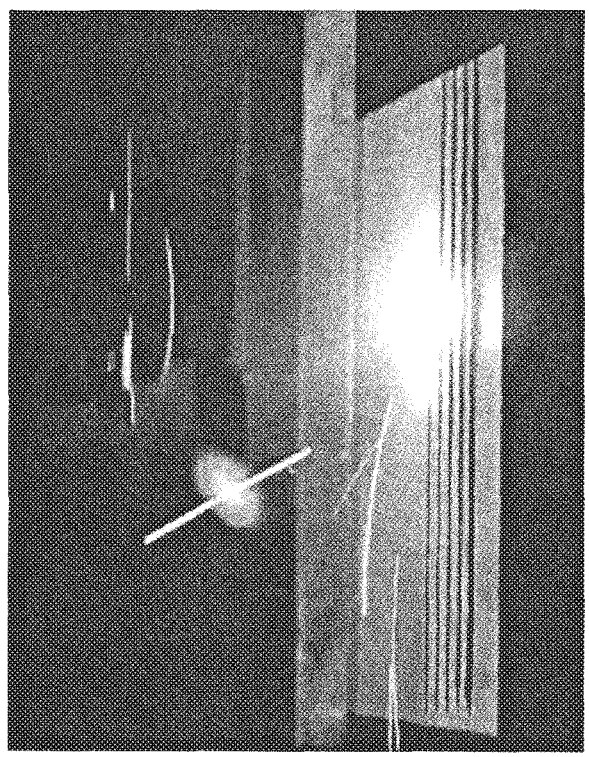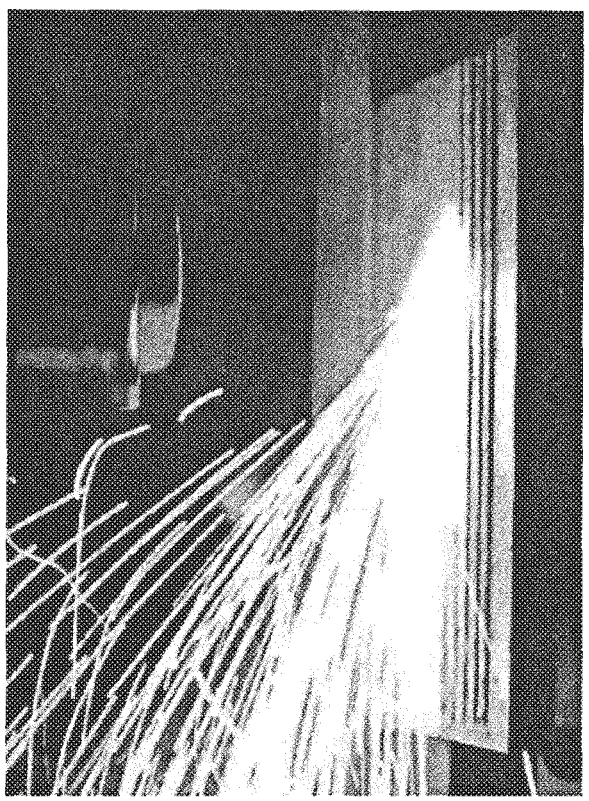
Fig. 4

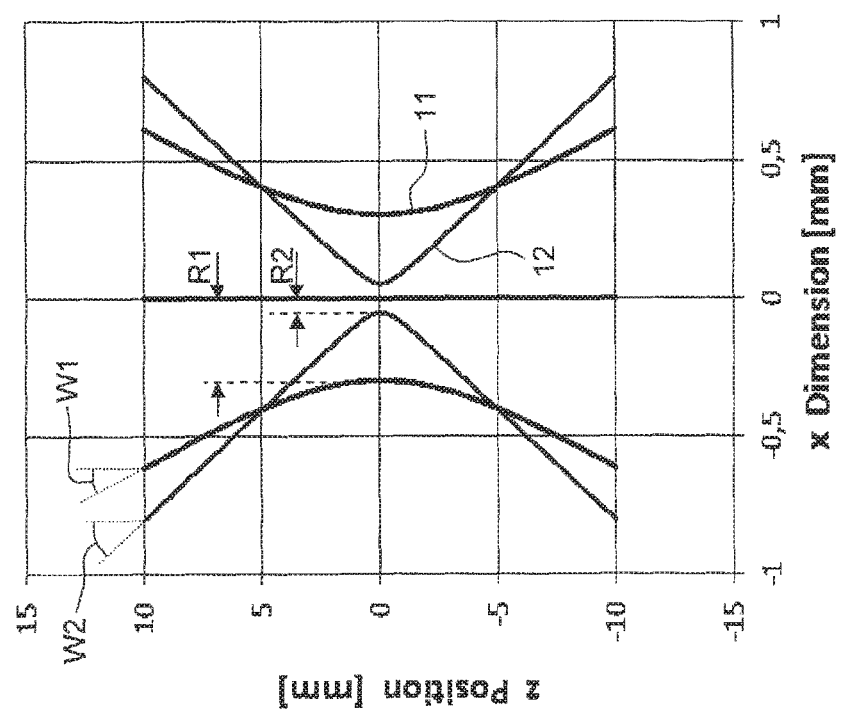

METHODS AND LASER WELDING DEVICES FOR DEEP WELDING A WORKPIECE

CROSS REFERENCE TO RELATED APPLICATIONS

This application is a continuation of and claims priority under 35 U.S.C. § 120 from PCT Application No. PCT/EP2017/079071 filed on Nov. 13, 2017, which claims priority from German Application No. DE 10 2016 222 357.7, filed on Nov. 15, 2016. The entire contents of each of these priority applications are incorporated herein by reference.

TECHNICAL FIELD

The disclosure relates to methods and laser welding devices for deep welding a workpiece by injecting a laser beam into the capillary opening produced by another laser beam.

BACKGROUND

Workpieces can be welded to one another at comparatively high speed on a narrow weld seam by laser welding. Only relatively little thermal energy is introduced into the workpieces, so that no or only minor thermal warping occurs.

In laser deep welding, the workpiece material is not only superficially melted, but rather a keyhole (vapor capillary) forms in the beam direction in the weld pool. The laser radiation can thus penetrate into greater depths, whereby stronger bonds can be produced between workpieces.

A particularly large welding penetration depth can be achieved using high-quality laser beams, e.g., a small beam parameter product (defined as aperture angle*radius of the laser beam at the thinnest point, often abbreviated BPP). On the other hand, a good weld seam quality can be achieved at higher feed rates using lower-quality laser beams, e.g., a large beam parameter product.

The quality of the weld seam is impaired by the formation of welding spatters. Liquid workpiece material is thrown out of the welding pool, which introduces notches into the weld seam and results in a material loss in the weld seam, whereby it is mechanically weakened, and also contaminates the environment.

Attempts have been made to affect the quality of the welding process by using multiple laser beams.

Superimposing a first and a second laser beam on a workpiece is described in US 2006/0157457 A1. The spot of the second laser beam is smaller than the spot of the first laser beam, wherein the spot of the second laser beam is located inside the spot of the first laser beam. The second laser beam is directed onto the forming keyhole. The method is to enable a large welding depth and width and also a high welding speed in workpieces having high reflectivity.

Similar methods, in which a laser beam having small spot produces a keyhole and is overlaid by a further laser beam having a larger spot to act on the surrounding weld pool are described, for example, in DE 10 2006 011 064 B4, EP 1 007 267 B1, DE 197 511 95, DE 198 59 243 A1, and JP 45 80065 A.

U.S. Pat. No. 7,807,939 B2 describes a laser welding method in which two lasers irradiate a workpiece in chronological alternation.

Furthermore, a laser welding method is described in JP 2004 358 521 A, in which laser beams from various laser sources or the same laser source are overlaid and focused in different depths of the workpiece. A similar method using laser sources having different wavelengths is described in JP 2006 263 771 A.

JP 2003 340 582 A proposes dividing a laser beam into a main beam having small diameter and high energy and a secondary beam having larger diameter and lower energy and focusing them differently. A keyhole is produced using the main beam.

SUMMARY

The disclosure is based on the object of providing a laser deep welding method in which a good seam quality is achievable with large welding penetration depth and high feed rate.

The disclosure relates to a methods for deep welding a workpiece, wherein a surface of the workpiece is irradiated using a first laser beam and a second laser beam, wherein, in a workpiece surface plane, a first beam width B1 of the first laser beam is greater than a second beam width B2 of the second laser beam, and wherein the second laser beam is located inside the first laser beam at least in the workpiece surface plane.

The new methods for deep welding a workpiece disclosed herein include the features that a surface of the workpiece is irradiated using a first laser beam and a second laser beam, wherein, in a workpiece surface plane, a first beam width B1 of the first laser beam is greater than a second beam width B2 of the second laser beam, and wherein the second laser beam is located inside the first laser beam at least in the workpiece surface plane, and that the intensity of the first laser beam alone is sufficient to produce a keyhole in the workpiece, and the keyhole produced in the workpiece has a capillary width KB in the workpiece surface plane, wherein KB is substantially equal to B1, and B2≤0.75*KB.

The intensity of the first laser beam is selected as sufficiently large that it is already capable per se of producing a keyhole in the workpiece (or at the interface of workpiece parts that are to be connected to form the workpiece). An opening is accordingly already produced by the first laser beam in the surface plane of the workpiece.

The second laser beam, which is smaller than the first laser beam, can be directed through this opening, so that the second laser beam is not incident on molten material (or even solid workpiece material) in the surface-proximal region of the workpiece, usually comprising at least the upper third of the workpiece (in relation to the depth in the workpiece). Absorptions and reflections of the second laser beam on the interface of the keyhole with the surrounding weld pool first take place at a certain distance from the workpiece surface, usually in a middle third and lower third of the keyhole (in relation to the depth in the workpiece), wherein energy is emitted.

The second laser beam thus utilizes the opening of the keyhole provided by the first laser beam to reach a lower-lying zone of the keyhole without (or with only minor) energy loss, to emit its energy there.

The capillary width KB of the keyhole in the scope of the methods described herein essentially corresponds to the first beam width B1 of the first laser beam (observed in the workpiece surface plane). Usually |KB−B1|≤0.2*B1, e.g., |KB−B1|≤0.15*B1, and often also |KB−B1|≤0.1*B1. In many cases, also B1≤KB.

The melt flow dynamics in the upper part of the weld pool decrease due to the lesser energy introduction in comparison to a single laser beam in the upper region of the workpiece. The flow speeds of the molten material are reduced, and the tendency toward turbulence becomes less. This in turn reduces the spatter formation and/or can be used for a higher feed rate during the laser welding process. At the same time, a large amount of energy can be provided by the second laser beam at greater depths, whereby the welding penetration depth can be increased in comparison to a single laser beam of low beam quality, and moreover a narrow seam shape is achieved.

The new methods and systems provide a predetermined welding penetration depth with good seam quality using lower laser power than in the prior art. The energy efficiency is thus increased, so that the operating costs and investment costs can be reduced. In addition, the more targeted energy injection results in less introduction of heat into the workpiece (component) and thus reduces internal tensions and workpiece warping.

The intensity of the first laser beam is typically just sufficient to produce a (stable) keyhole in the workpiece using the first laser beam alone; the intensity of the first laser beam is typically at most twice as high as necessary to produce a stable keyhole using the first laser beam alone.

The specified ratios for the widths (for example, $B1$, $B2$, $KB$) apply at least along the feed direction (welding direction) of the laser welding process, and typically also with respect to any direction within (or parallel to) the workpiece surface plane. In certain embodiments, $B2 \leq 0.5*KB$ or also $B2 \leq 0.4*KB$ or even $B2 \leq 0.3*KB$, also $B2 \leq 0.5*B1$ or $B2 \leq 0.4*B1$.

The first and the second laser beams can be generated using a common laser source or by using separate laser sources. The first laser beam and the second laser beam are typically coaxial. It is to be noted that (in the workpiece surface plane) the second laser beam can overlap with the first laser beam, or the first laser beam can enclose the second laser beam in a ring shape.

In some embodiments, the first laser beam and the second laser beam have the same focal position or focal positions spaced apart from one another by less than 1 mm with respect to a z direction that extends perpendicularly to the surface of the workpiece. A particularly simple, common imaging optical unit can be used for both laser beams. Moreover, an introduction of the energy of the second laser beam can usually take place at a great depth; the beam profile of the second laser beam can optimally utilize the free space of the keyhole provided by the first laser beam.

In some embodiments, the focal positions of the first and second laser beams are located in the workpiece surface plane or below the workpiece surface within the keyhole. The seam quality is thus optimized. In general, common foci are located or the lower-lying focus is located at maximum at a depth corresponding to half of the depth extension of the keyhole or the workpiece thickness (with respect to the z direction).

In some embodiments, the second laser beam has a better beam quality than the first laser beam, e.g., with $BPP1 \geq 2*BPP2$, or $BPP1 \geq 4*BPP2$, where $BPP1$ is a beam parameter product of the first laser beam and $BPP2$ a beam parameter product of the second laser beam. Both large welding penetration depths and also high feed rates could thus be achieved with good seam quality. The advantage of a low BPP (high beam quality), specifically a large welding penetration depth, can be combined with the advantages of a high BPP (lower beam quality), specifically a better seam quality or a higher selectable feed rate.

A variant is also advantageous in which the following applies for a first laser power $L1$ of the first laser beam and a second laser power $L2$ of the second laser beam: $L2 \geq L1$, $L2 \geq 2*L1$. This has proven itself in practice to obtain a greater energy introduction at greater depth of the keyhole. Good welding results were also achieved using equal laser powers $L2=L1$. The intensity of the second laser beam alone would also be sufficient to produce a keyhole in the workpiece. Furthermore, $L2 \geq 5*L1$ usually also applies. Alternatively, however, $L2 < L1$ can also be selected. In general, the intensity of the second laser beam in the focus is at least equal to the intensity of the first laser beam in the focus.

Furthermore, in some embodiments, the following applies for a first focusing angle $W1$ of the first laser beam and a second focusing angle $W2$ of the second laser beam: $W2 \geq W1$. In the case of a common focal position under the workpiece surface, in general an undesired contact of the second laser beam with the molten material close to the workpiece surface can be avoided. Moreover, a particularly narrow beam caustic of the second laser beam can often be configured (in comparison to the first laser beam). Alternatively, $W2 < W1$ can also be provided.

In some embodiments, the following applies for a smallest width $KD$ of the keyhole in the top quarter (close to the workpiece surface) of the keyhole and for a greatest width $G2$ of the second laser beam in the top quarter of the keyhole: $0.8*KD \geq G2$, or $0.6*KD \geq G2$. The energy introduction into the weld pool in the surface-proximal quarter of the keyhole can thus be reduced, and a particularly good seam quality and/or a particularly high feed rate can be achieved. With respect to a smallest width $K1$ of the first laser beam in the upper quarter of the keyhole, also $0.8*K1 \geq G2$ or $0.6*K1 \geq G2$.

In some embodiments, the first laser beam and the second laser beam are aligned coaxially having a common beam axis. Due to the coaxial alignment, the second laser beam can penetrate into particularly large depths of the workpiece, without firstly encountering the molten material. Moreover, the welding device can have a simple construction.

As a further development thereto, the common beam axis extends substantially perpendicular to the workpiece surface. The welding penetration depth is thus optimized. In particular, the beam axis can be selected having a deviation from the perpendicular to the workpiece surface of 5° or less, e.g., 0°. Depending on the type of joint and weld seam, however, other angles of incidence are also applicable, in particular having a deviation of more than 5° from the perpendicular to the workpiece surface.

The first and the second laser beams can be guided jointly in an optical waveguide, since a particularly simple construction for the light transportation and imaging on the workpiece can be achieved in this way. A common fiber can be used, for example, by using different coupling angles of the laser beams, different coupling locations on the entry surface of the fiber (for example, centric and eccentric), and/or different wavelengths of the laser beams, or multiple fibers or multicore fibers (e.g., multiple fiber cores located adjacent to one another or located coaxially one inside another) can be used.

Furthermore, in some embodiments, the first and the second laser beams are guided in a two-in-one fiber having a core fiber and a ring fiber, in particular wherein the first laser beam is guided in the ring fiber and the second laser beam is guided in the core fiber, the first and second laser beams exit from a fiber end of the two-in-one fiber before the workpiece, and the fiber end having ring fiber and core fiber is imaged by a common optical unit in a common focus on or in the workpiece, whereby the first and second laser beams are directed by the common optical unit onto the workpiece, in particular wherein the common optical unit comprises a collimation lens and a focusing lens, preferably exclusively comprises them. A particularly simple construction for the laser light transportation and the imaging on the workpiece can be used.

In an advantageous further development, a common laser source generates an original laser beam, wherein a first part of the original laser beam is coupled eccentrically into the ring fiber and forms the first laser beam, and a second part of the original laser beam is coupled into the core fiber and forms the second laser beam. It is thus possible using a single laser source (beam source) to provide a partial beam of high beam quality and a partial beam of low beam quality in a simple manner automatically by the (common) coupling into the two-in-one fiber. Depending on which of the fibers the original laser beam part is coupled into, it exits having different laser beam characteristics at the other fiber end. To control the beam components on core and ring fibers, a wedge plate movable in the beam path of the original laser beam can be provided. Two-in-one fibers that have a core fiber having the smallest possible core fiber diameter ≤150 μm and a ring fiber having an external diameter greater than three times the core fiber diameter have proven to be particularly advantageous for generating different laser characteristics.

In some embodiments, a first laser source generates the first laser beam and a second laser source generates the second laser beam, and the first laser beam and the second laser beam are superimposed by a beam splitter element. In this so-called twin-spot technology, the laser sources for the first and second laser beams can be freely selected. The construction of a corresponding laser welding device is overall simple and cost-effective.

In some embodiments, the superimposed laser beams are directed onto the workpiece using a common focusing optical unit, in particular a focusing lens. This is particularly simple and proven in practice.

Another alternative embodiment provides that the first and the second laser beams are guided in a dual-core fiber having two laser fibers located adjacent to one another and parallel to one another, the first and second laser beams exit from the fiber ends of the dual-core fiber before the workpiece, and the fiber ends of the laser fibers are imaged via a common optical unit in a common focus on or in the workpiece, whereby the first and second laser beams are directed by the common optical unit onto the workpiece, in particular wherein the common optical unit comprises a collimation lens and a focusing lens, preferably exclusively comprises them. A comparatively simple configuration of a laser welding device for the light transportation and the imaging of the laser beams on the workpiece is thus possible.

A laser welding device designed as described herein can carry out the above-described methods. Workpieces, in particular steel workpieces, can be welded with large welding penetration depth and at high feed rate and good seam quality using the laser welding device.

Further advantages of the invention result from the description and the drawing. The above-mentioned features and the features to be set forth hereafter can also each be used individually or together in arbitrary combinations. The embodiments shown and described are not to be understood as an exhaustive list, but rather have exemplary character for the description of the invention.

DESCRIPTION OF DRAWINGS

The invention is illustrated in the drawings and will be explained in greater detail on the basis of exemplary embodiments.

FIG. 4 shows experimental diagonal views of the weld pool during welding using a) one laser beam and b) two laser beams.

FIG. 9 shows a schematic illustration of the beam caustics of first and second laser beams having unequal aperture angles.

DETAILED DESCRIPTION

In deep laser beam welding, a vapor capillary (keyhole) is moved through a liquid weld pool by the relative movement between laser beam and workpiece. However, at excessively high feed rates, a plurality of weld spatters detach and the quality of the weld seam is reduced due to the formation of notches.

In conventional deep laser beam welding, the largest part of the laser energy is absorbed in the upper region of the keyhole. The laser beam is first incident on the workpiece in this region. The focal plane is usually also positioned here. The location of the greatest power density is thus located here.

The melt flow dynamics increase with rising absorbed energy, and upon reaching critical values, the above-mentioned negative effects arise, causing a mass loss in the seam and/or pronounced cyclic melt flow behavior.

If a laser beam having very good beam quality is used, the resulting welding penetration depth is increased (with equal introduction of energy) in comparison to a laser of low beam quality. However, the limit of good weld seam quality shifts toward lower feed rates. A particularly high surface-proximal absorbed power density may be the cause of this. Moreover, if a laser beam having high beam quality is used, a narrower keyhole arises, which threatens to collapse faster at high speeds than a wider keyhole generated by a laser beam of lower beam quality.

As described herein, in the new laser systems and methods, the energy injection is intentionally displaced into lower regions of the keyhole in parts, so that high welding penetration depths are achieved with good seam quality for the largest possible speed range.

Figure 1:
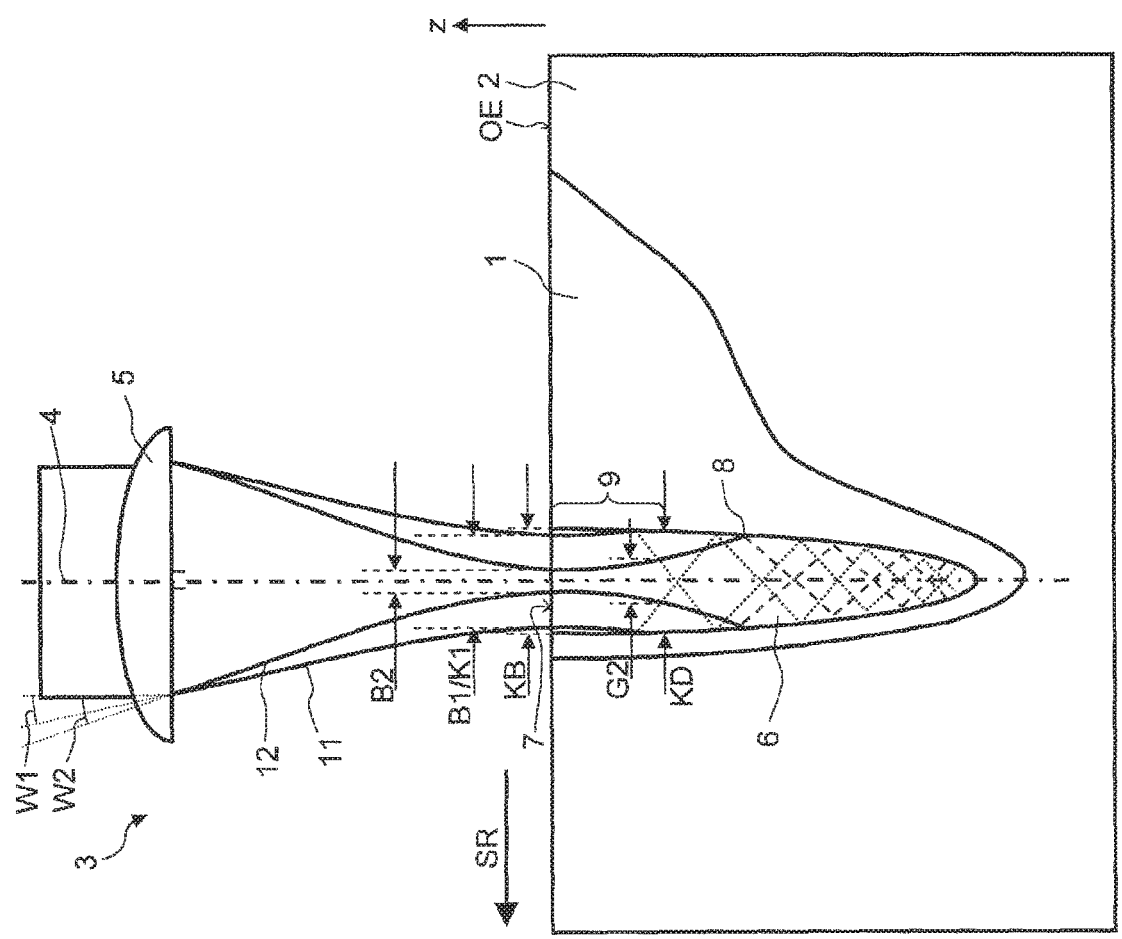
FIG. 1 shows a schematic longitudinal section through a part of a laser welding device and a workpiece.

FIG. 1 shows a schematic longitudinal section through the region of the weld pool 1 in a workpiece 2, which is welded using a variant of the deep welding method using a laser welding device 3 as described herein (only partially shown in FIG. 1). The (relative) welding direction SR is directed to the left here, for example, by the workpiece 2 being moved to the right (with otherwise fixed laser welding device 3).

A first laser beam 11 and a second laser beam 12 are guided coaxially along a common beam axis 4 and are focused by a focusing optical unit 5 of the laser welding device 3 on the workpiece 2, for example, to weld two workpiece parts, the contact surface of which is located in the plane of the drawing of FIG. 1, to form the workpiece 2. The beam axis 4 extends perpendicularly to the workpiece surface plane OE in the illustrated example. Both laser beams 11, 12 have an essentially rotationally-symmetrical ("circular") intensity profile here (in relation to the beam axis 4). The locations where the intensity has dropped to half of the maximum intensity can be used as the boundaries of the laser beams 11, 12.

In the example shown, the two laser beams 11, 12 have the focus thereof in the workpiece surface plane OE, so that the laser beams 11, 12 each have the smallest diameter thereof ("waist") in this location. The diameter (FWHM) of the first laser beam 11 in the workpiece surface plane OE, denoted first beam width B1, is significantly greater than the diameter (FWHM) of the second laser beam 12 in the workpiece surface plane OE, denoted second beam width B2, where approximately B2=0.25*B1 here. Overall, the caustic of the second laser beam 12 is smaller than the caustic of the first laser beam 11.

The first laser beam 11 alone has sufficient intensity to produce a keyhole 6 in the workpiece 2. The capillary width KB of the keyhole 6 in the workpiece surface plane OE is accordingly approximately as large as the first beam width B1; in the example shown, KB is slightly larger than B1, where approximately KB=1.15*B1. Molten material (molten workpiece material) is arranged around the keyhole 6, wherein the largest part of the weld pool 1 is located behind the keyhole 6 (in relation to the welding direction SR).

Since the second beam width B2 of the second laser beam 12 is significantly smaller than the first beam width B1 of the first laser beam 11, the second laser beam 12 can pass the opening 7 of the keyhole 6 without being incident on the molten material of the weld pool 1. In the example shown, the first partial absorption 8 of the second laser beam 12 at the boundary surface of the keyhole 6 first occurs in a middle third (in relation to the direction z into the workpiece 2) of the keyhole 6, and the unabsorbed part of the radiation is reflected, see the reflected second laser beam 12 shown by dashed lines. Accordingly, energy is hardly introduced into the weld pool 1 by the second laser beam 12 close to the surface. It is to be noted that the first laser beam 11 is partially absorbed and partially reflected for the first time already significantly farther above, see the reflected first laser beam 11 shown by dotted lines.

The greatest width (diameter) G2 of the second laser beam 12 (at the lower edge of the upper quarter 9) and the smallest width (diameter) KD of the keyhole 6 (also at the lower edge of the upper quarter 9) can be determined in the upper quarter 9 of the keyhole 6. The smallest width (diameter) K1 of the first laser beam 11 (at the upper edge of the quarter 9 in the workpiece surface plane) can also be determined. In the example shown, approximately G2=0.46*KD applies, and approximately G2=0.5*K1. Because G2 is significantly less than KD or K1, respectively, the injection of the energy of the second laser beam 12 can be conveyed further above all in the lower region of the keyhole 6, and especially not in the upper quarter 9, into the weld pool 1.

Because of the energy injection of the second laser beam 12 into the lower-lying region of the keyhole 6, the weld pool dynamics can be reduced, e.g., close to the surface. Turbulence is prevented or reduced. The detachment of weld spatters is thus decreased and the waviness of the resulting weld seam is reduced.

In the embodiment shown, the beam parameter product BPP1 of the first laser beam is approximately 2.7 times as large as the beam parameter product BPP2 of the second laser beam 12, i.e., the second laser beam 12 has the better beam quality. A multimode laser beam is typically selected as the first laser beam (having lower beam quality). The beam parameter products BPP1, BPP2 can be determined as the product of the respective focus angles (aperture angles in the far field) W1, W2 with the radii of the respective laser beams 11, 12 at the narrowest point of the caustic (thus half of the beam widths B1, B2). In the example shown, W1<W2, with approximately W1=0.68*W2.

To produce a high-quality weld seam at high feed rate (welding speed), the first laser beam 11 initiates the formation of the vapor capillary (keyhole) 6 with sufficiently large diameter, e.g., of the upper opening 7. At the same time, the second laser beam 12 is directed or focused (coaxially) into the keyhole 6 formed, wherein the caustic of the second laser beam 12 is smaller than that of the first laser beam 11. The energy of the second laser beam 12 is first absorbed/coupled in a lower zone of the keyhole 6. The absorbed energy in the upper region of the keyhole is reduced in relation to the prior art and increased in the lower region; as a result, the welding penetration depth is increased, wherein high feed rates are nonetheless possible.

Figure 2:
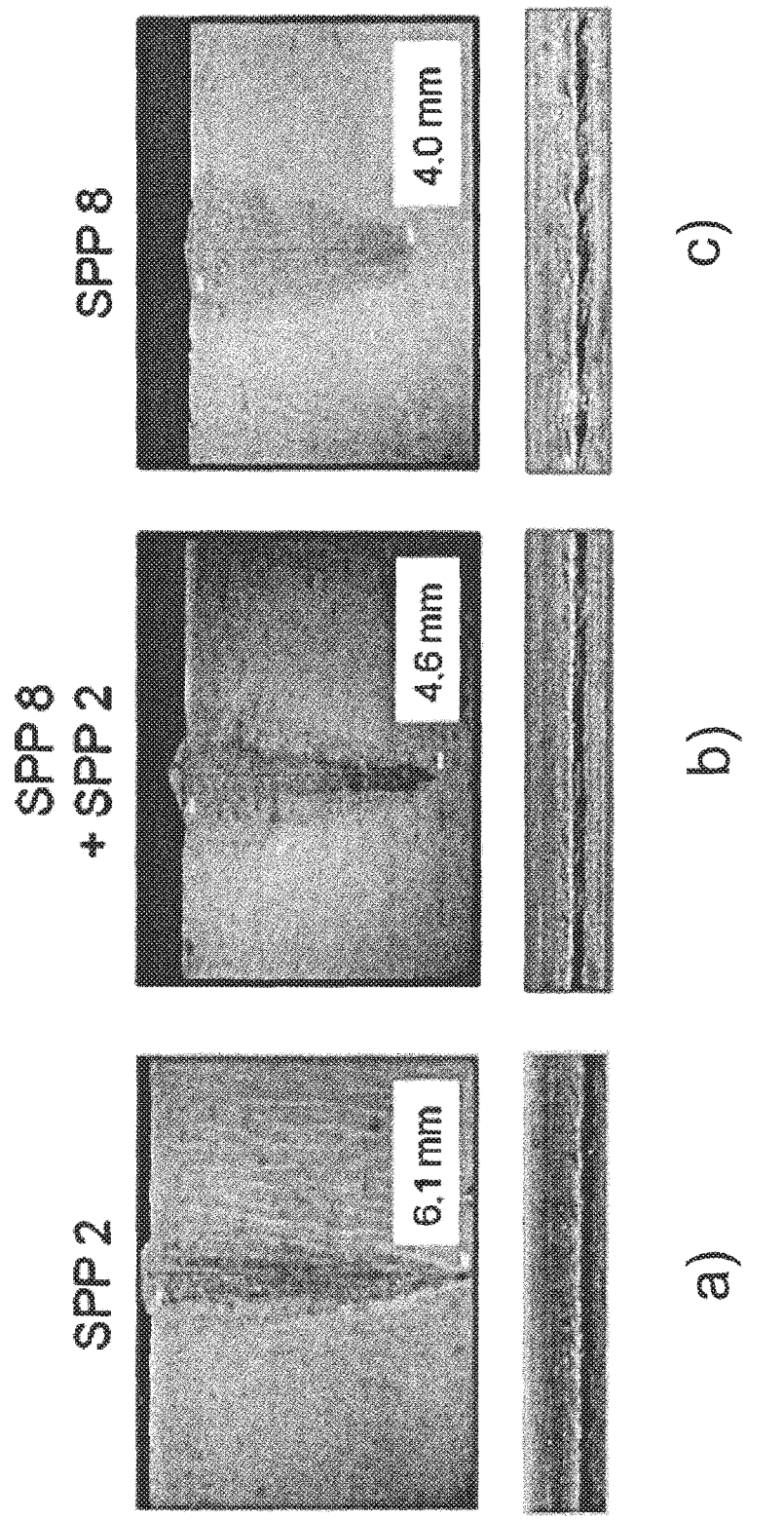
FIG. 2 shows experimental polished cross-sections through a weld seam (at the top) and top views of a weld seam (at the bottom) for deep welding using a) a laser beam of high beam quality, b) two laser beams, and c) a laser beam of low beam quality, at low welding speed.

For the images of FIG. 2, workpieces made of structural steel were subjected to blind welding, with a) a laser beam having BPP=2 mm*mrad, focus diameter 150 μm, laser source TruDisk® 5000.5, with b) two coaxial laser beams as described herein, with BPP=2 mm*mrad and BPP=8 mm*mrad, focus diameter 150 μm and 300 μm, laser source TruDisk® 5000.5 and TruDisk® 16002, and with c) a laser beam with BPP=8 mm*mrad, focus diameter 300 μm, laser source TruDisk® 16002. In all cases, the feed rate was 1 m/min and the total laser power was P=2 kW, in case b) with 1 kW per laser beam. The focal position was at −4 mm in the workpiece in each case.

As is apparent from the respective top cross-sectional images of FIG. 2, it was possible to achieve a welding penetration depth of 6.1 mm using one laser beam having BPP=2 mm*mrad, and only a welding penetration depth of 4.0 mm at equal laser power using one laser beam having BPP=8 mm*mrad. By combining two lasers having BPP=2 mm*mrad and BPP=8 mm*mrad, with overall equal power, a welding penetration depth of 4.6 mm could be achieved which is significantly more than using the one laser beam having BPP=8 mm*mrad.

At the comparatively low feed rate of 1 m/min, an acceptable seam quality was achieved in all workpieces, see the respective lower top view images.

Figure 3:
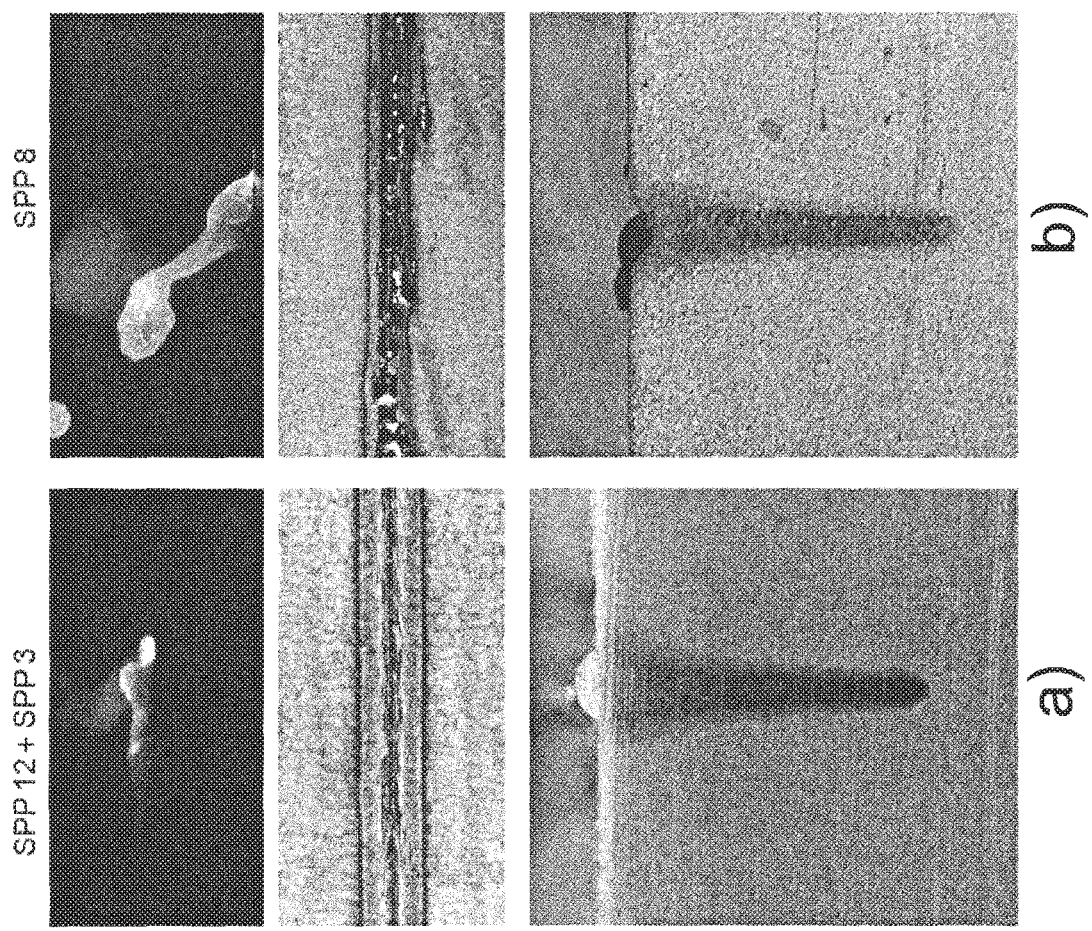
FIG. 3 shows experimental side views of the weld pool during welding (at the top), top views of the weld seam (in the middle), and cross sections through the weld seam (at the bottom) using a) two laser beams, and b) one laser beam, at high welding speed.

If a higher feed rate is selected, the seam quality is influenced more strongly. For FIG. 3, workpieces made of structural steel were again welded, on the one hand, with a) two coaxial laser beams as described herein, having BPP=12 mm*mrad and BPP=3 mm*mrad and, on the other hand, with b) one laser beam, having BPP=8 mm*mrad. The total laser power was 5 kW in each case (in the case of two laser beams, 2.5 kW each), the focal position was −2 mm, and the feed rate was 8 m/min.

It is apparent from the side views recorded during the welding process shown at the top in each case that when using two laser beams a) a calm weld pool is obtained, while substantial ejection of molten material droplets (welding spatters) occurs using the single laser beam b). The seam quality is very good upon use of the two laser beams a), as is apparent from the top views in the middle of FIG. 3, while an uneven weld seam with numerous beads is obtained if only one laser beam b) is used. It is also apparent in the cross-sectional views at the bottom in FIG. 3 that in b) the weld seam forms a noticeable depression as a result of material loss and has uneven surface beads, while in a) no depression and a symmetrical, central weld bead are recognizable.

Larger image details during the welding of workpieces made of structural steel are shown in a diagonal view in each case in FIG. 4, in a) using one laser beam, focus diameter 440 μm, and in b) using two laser beams as described herein, focus diameters 110 μm and 440 μm. The feed rate was 10 m/min, the total laser power was 5 kW (in the case of two laser beams, 2.5 kW each), and the focal position was −2 mm, in each case.

If only the single laser beam a) is used, a substantial tail-like ejection of weld spatters occurs to the rear, while if the two laser beams b) are used, only a minimal ejection of weld spatters is observed.

Figure 5:
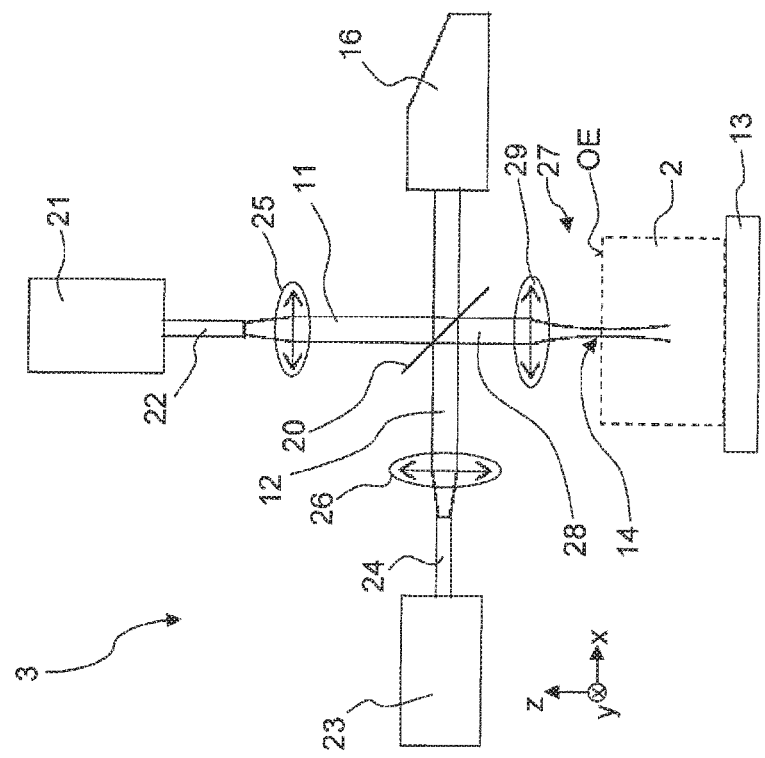
FIG. 5 shows a schematic view of a first embodiment of a laser welding device in twin-spot technology using a beam splitter element.

An embodiment of a laser welding device 3 as described herein is shown in a schematic drawing in FIG. 5. The illustrated laser welding device 3 operates using the so-called twin-spot technology having a beam splitter element 20.

The laser welding device 3 comprises a first laser source 21 that generates a first laser beam 11 typically having low beam quality. If necessary, the first laser beam 11 can be partially transported via an optical fiber 22. Furthermore, a second laser source 23 generates a second laser beam 12 typically having high beam quality. If necessary, the second laser beam 12 can also be partially transported via an optical fiber 24. The first laser beam 11 is collimated (parallelized) via a first collimator optical unit 25 and directed onto the beam splitter element 20 (typically a semitransparent mirror). The second laser beam 12 is collimated (parallelized) via a second collimator optical unit 26 and also directed onto the beam splitter element 20. The second laser beam 12 is rotated by 90° in relation to the first laser beam 11, and the beam splitter element 20 is arranged at a 45° angle in relation to the laser beams 11, 12.

A so-called beam dump 16 is arranged in extension of the beam axis of the second laser beam 12.

The welding station 27 is configured in the extension of the beam axis of the first laser beam 11. The overall beam 28 made of components of first laser beam 11 and second laser beam 12 after the beam splitter element 20 is focused using a common focusing optical unit 29 for the first and second laser beams 11, 12 and directed onto a workpiece 2 to be welded. The (common) focus 14 is located in the workpiece surface plane OE.

The workpiece 2 is arranged on a positioning table 13, using which the workpiece 2 can be moved along the beam axis 4 (z direction) of the overall beam 28, e.g., to set the focal position, and also in the directions perpendicular thereto (x direction and y direction), to travel down a desired weld seam.

Figure 6:
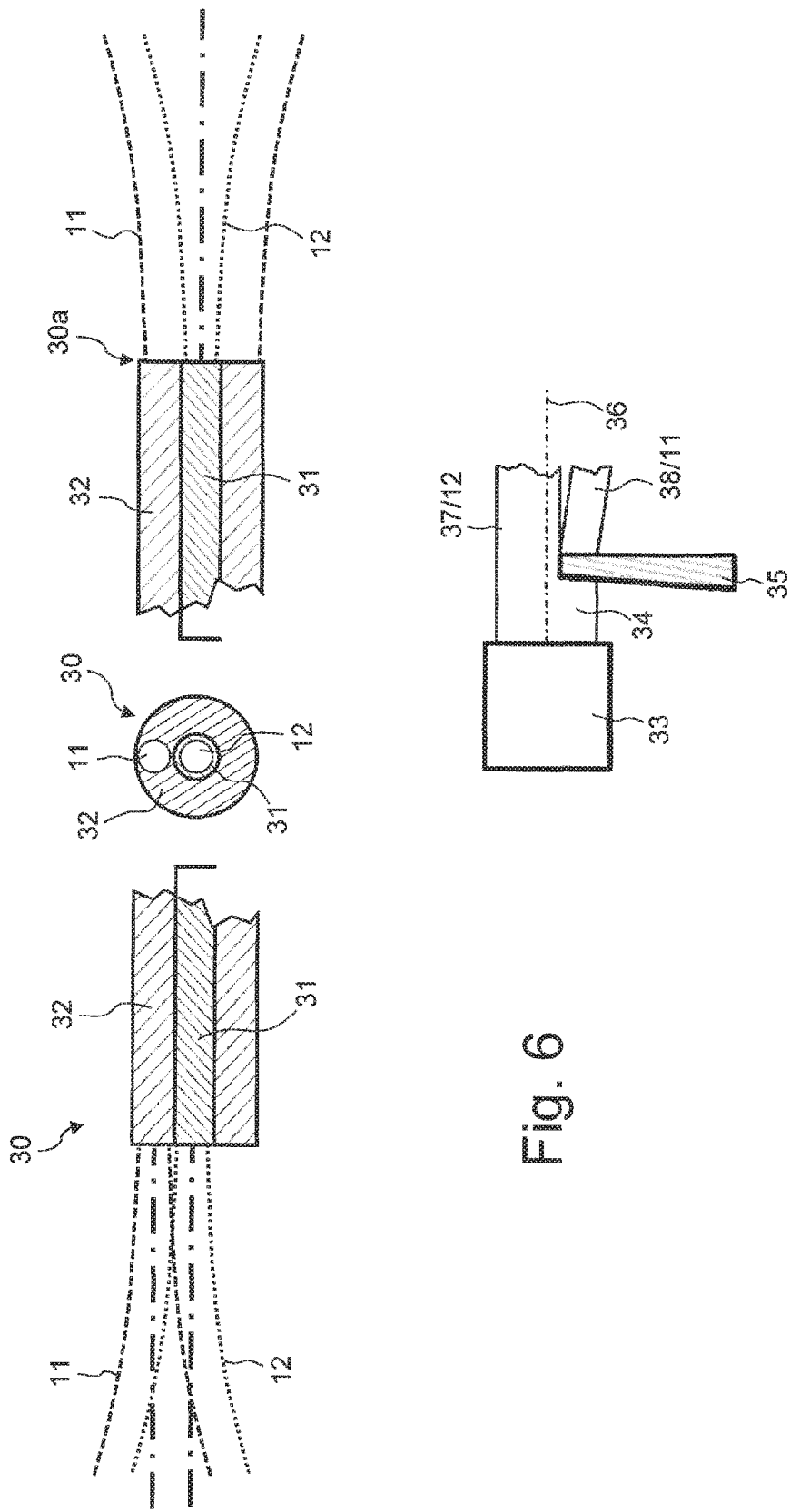
FIG. 6 shows a schematic longitudinal sectional view through a two-in-one fiber (top), and an associated beam generating construction (bottom).

The top of FIG. 6 shows a schematic longitudinal section of a two-in-one fiber 30, which can be used as part of laser welding devices as described herein.

The two-in-one fiber 30 comprises a central core fiber 31 and a surrounding ring fiber 32, in each of which laser light can be guided. A first laser beam 11 is coupled into the ring fiber 32 and a second laser beam 12 is coupled into the core fiber 31 (shown at the top left). During the coupling, the first and second laser beams 11, 12 each have a circular cross section (see the cross-sectional view of the two-in-one fiber 30 in the top middle).

The first laser beam 11 to be coupled in and the second laser beam 12 to be coupled in can originate from a common laser source 33 that generates an original laser beam 34, from which a first radiation component 38 and a second radiation component 37 are generated using a wedge plate 35, for example (shown at the bottom in FIG. 6). The farther the wedge plate 35 is moved into the beam path of the original laser beam 34, the larger the radiation component 38, which is deflected thereby, becomes. That is, the components of the distribution onto the two laser beams 11, 12 are controllable.

Depending on which of the fibers 31, 32 the respective generated laser beam 11, 12 is coupled into, it exits having different laser beam characteristics at the fiber end 30a. For the coupling into the fiber 30, a focusing optical unit (not shown in greater detail) is typically provided between the wedge plate 35 and the fiber 30. The first radiation component 38 of the original laser beam 34 (for the first laser beam 11) is eccentrically coupled into the outer ring fiber 32, and the second radiation component 37 of the original laser beam 34 (for the second laser beam 12) is centrically coupled into the inner core fiber 31.

The second laser beam 12 from the core fiber 31, which is decoupled at the fiber end 30a (see top right in FIG. 6), has a narrow filled circular profile corresponding to the inner core fiber 31, and also a comparatively high beam quality having a sharp focus. The decoupled first laser beam 11 from the ring fiber 32 has a ring profile corresponding to the outer ring core having homogeneous power distribution, and also a comparatively lower beam quality caused by the eccentric coupling.

In summary, the core fiber 31 has a narrower diameter than the ring fiber 32, whereby the second laser beam 12 intrinsically receives a better beam quality than the first laser beam 11. Upon decoupling from the fiber end 30a, the first laser beam 11 is distributed over the entire ring fiber 32, that is, around the core fiber 31 or the exiting first laser beam 11, respectively. The exiting laser beams 11, 12 can be focused using a common optical unit on the workpiece (not shown in greater detail, but see FIG. 7 in this regard).

Figure 7:
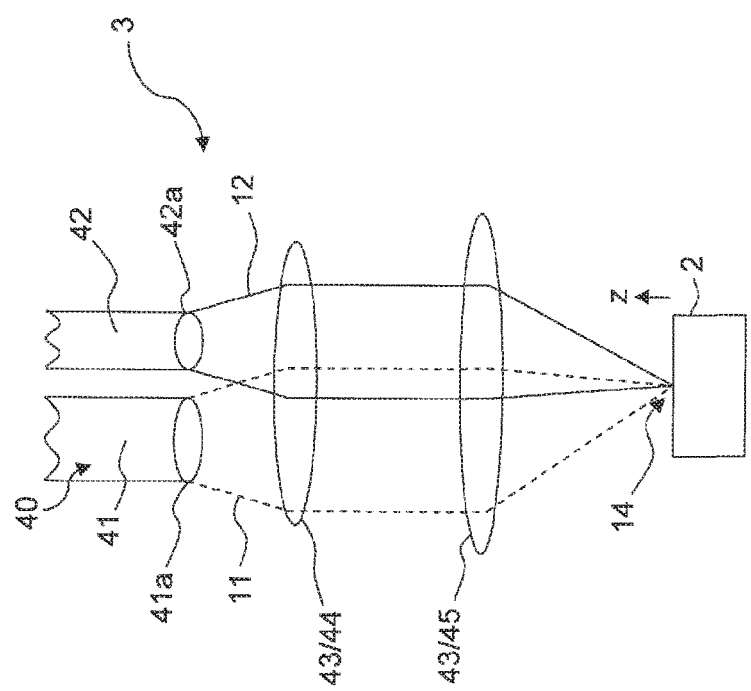
FIG. 7 shows a schematic view of a dual-core fiber arrangement.

FIG. 7 schematically shows a part of a laser welding device 3 having a dual-core fiber 40. The dual-core fiber comprises two optical fibers (laser fibers) 41, 42 extending in parallel to one another and typically arranged at a fixed spacing from one another by a common cladding (not shown). The first laser beam 11 (shown by dashed lines) and the second laser beam 12 (shown by solid lines) exit at the fiber ends 41a, 42a and are directed and focused via a common optical unit 43, comprising a collimation lens 44 and a focusing lens 45, onto a workpiece 2. The laser beams 11, 12 are focused at the same location, e.g., at the same depth (z position) in the workpiece 2, see focus 14, but do not extend coaxially. The two optical fibers 41, 42 are formed from an optical fiber 41 having large diameter (for example, 440 μm) for the first laser beam 11 having low beam quality and an optical fiber 42 having a smaller diameter (for example, 110 μm) for the second laser beam 12 having high beam quality. The laser beams 11, 12 can be provided either from different laser sources having different beam qualities, or can originate from a single, common laser source, wherein the beam quality of the first laser beam 11 is then worsened, for example, by eccentric coupling into the optical fiber 41 having large diameter or other known methods.

It is to be noted that using a common optical unit 43 as shown in FIG. 7, the laser beams 11, 12 which exit from a fiber end 30a of the two-in-one fiber 30 (see FIG. 6) can be focused on or in a workpiece 2 (not shown here).

Figure 8:
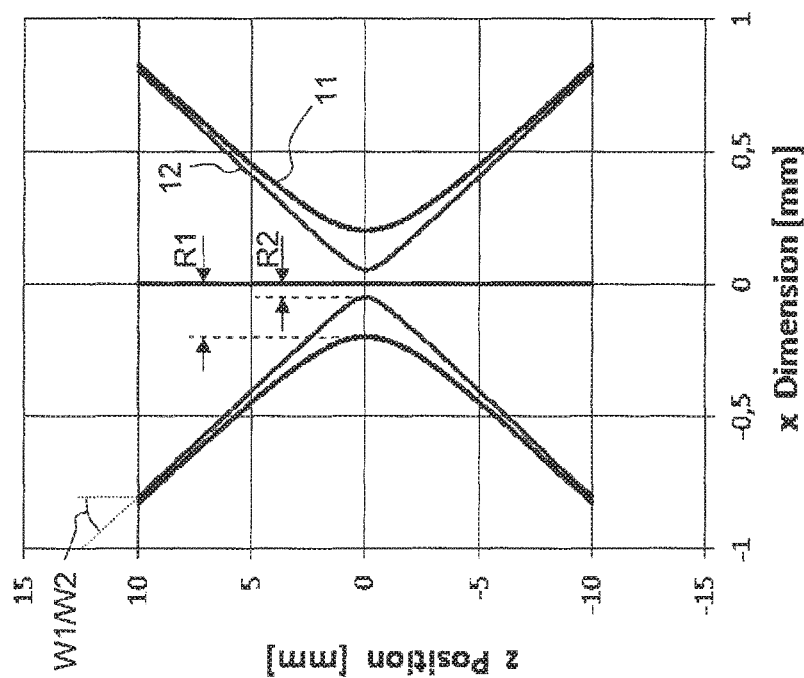
FIG. 8 shows a schematic illustration of the beam caustics of first and second laser beams having approximately equal aperture angles.

Typical caustics of laser beams 11, 12 are shown in FIG. 8. The first laser beam 11 and the second laser beam 12 have approximately equal focusing angles (aperture angles) W1, W2. However, the radius R1 of the first laser beam 11 at the narrowest point (at z=0, in the workpiece surface plane) is approximately three times as large as the radius R2 of the second laser beam 12 at the narrowest point. The first laser beam 11 accordingly has an approximately three times greater beam parameter product BPP1 than the second laser beam 12 having beam parameter product BPP2.

FIG. 9 shows further caustics of laser beams 11, 12 that can be used. The first laser beam 11 has a smaller focusing angle W1 than the second laser beam 12 having focusing angle (aperture angle) W2, with approximately W2=1.3*W1. The radius R1 of the first laser beam 11 at the narrowest point (at z=0, in the workpiece surface plane) is approximately 5.8 times as large as the radius R2 of the second laser beam 12 at the narrowest point. The first laser beam 11 has an approximately 4.5 times greater beam parameter product BPP1 than the second laser beam 12 having beam parameter product BPP2.

Other Embodiments

A number of embodiments of the invention have been described. Nevertheless, it will be understood that various modifications may be made without departing from the spirit and scope of the invention. Accordingly, other embodiments are within the scope of the following claims.

LIST OF REFERENCE NUMERALS 1 weld pool
2 workpiece
3 laser welding device
4 beam axis
5 focusing optical unit
6 vapor capillary (keyhole)
7 opening
8 first absorption/reflection (second laser beam)
9 top quarter (keyhole)
11 first laser beam
12 second laser beam
13 positioning table
14 focus
16 beam dump
20 beam splitter element
21 first laser source
22 optical fiber (laser fiber)
23 second beam source
24 optical fiber (laser fiber)
25 first collimating optical unit
26 second collimating optical unit
27 welding station
28 overall beam
29 focusing optical unit
30 two-in-one fiber
30a fiber end (two-in-one fiber)
31 core fiber
32 ring fiber
33 common laser source
34 original laser beam
35 wedge plate
36 beam axis (original laser beam)
37 second radiation component (part of the original laser beam)
38 first radiation component (part of the original laser beam)
40 dual-core fiber
41 optical fiber (laser fiber)
41a fiber end
42 optical fiber (laser fiber)
42a fiber end
43 common optical unit
44 collimating lens
45 focusing lens
B1 first beam width
B2 second beam width
G2 greatest width of the second laser beam in the top quarter
K1 smallest width of the first laser beam in the top quarter
KB capillary width
OE workpiece surface plane
SR welding direction
W1 first focusing angle
W2 second focusing angle

What is claimed is:

1. A method for deep welding a workpiece, the method comprising:
    irradiating a surface of the workpiece using a first laser beam and a second laser beam, wherein, in a workpiece surface plane, a first beam width B1 of the first laser beam is greater than a second beam width B2 of the second laser beam, and wherein the second laser beam is directed onto an area of the workpiece surface plane within an area of the workpiece surface plane onto which the first laser beam is directed,
        wherein an intensity of the first laser beam alone is sufficient to produce a keyhole in the workpiece and the keyhole produced in the workpiece has a capillary width KB in the workpiece surface plane, wherein KB is substantially equal to B1, and B2≤0.75*KB, wherein BPP1 is a beam parameter product (BPP) of the first laser beam and BPP2 is a beam parameter product of the second laser beam, wherein BPP1>BPP2, and wherein a high BPP represents a low beam quality;
    guiding the first and second laser beams in a multicore fiber having at least one core fiber and a ring fiber, wherein the first laser beam is guided in the ring fiber and the second laser beam is guided in the core fiber, and the first and second laser beams exit from a fiber end of the multicore fiber before the workpiece;
    directing the first and second laser beams by a common optical unit onto the workpiece; and
    imaging the fiber end with the common optical unit in a common focus on or in the workpiece, wherein the common optical unit comprises a collimation lens and a focusing lens.

2. The method of claim 1, wherein the first laser beam and the second laser beam have a same focal position or have focal positions spaced apart from one another by less than 1 mm in a direction perpendicular to the surface of the workpiece.

3. The method of claim 1, wherein focal positions of the first and second laser beams are located in the workpiece surface plane or below the workpiece surface inside the keyhole.

4. The method of claim 1, wherein BPP1>2*BPP2.

5. The method of claim 1, wherein a first laser power L1 of the first laser beam is less than or equal to a second laser power L2 of the second laser beam.

6. The method of claim 5, wherein L2 >2*L1.

7. The method of claim 1, wherein a first focusing angle W1 of the first laser beam is less than or equal to a second focusing angle W2 of the second laser beam.

8. The method of claim 1, wherein for a smallest width KD of the keyhole in a top quarter closest to the workpiece surface, and for a greatest width G2 of the second laser beam in the top quarter of the keyhole 0.8*KD>G2.

9. The method of claim 8, wherein 0.6*KD >G2.

10. The method of claim 1, further comprising aligning the first laser beam and the second laser beam coaxially to have a common beam axis.

11. The method of claim 10, wherein the common beam axis extends substantially perpendicularly to the workpiece surface.

12. The method of claim 1, wherein the multicore fiber is a two-in-one fiber having a core fiber and a ring fiber, wherein the first laser beam is guided in the ring fiber and the second laser beam is guided in the core fiber, and the first and second laser beams exit from a fiber end of the two-in-one fiber.

13. The method of claim 1, wherein the common optical unit consists of a collimation lens and a focusing lens.

14. The method of claim 1, further comprising generating an original laser beam from a common laser source, wherein a first part of the original laser beam is eccentrically coupled into the ring fiber and forms the first laser beam, and a second part of the original laser beam is coupled into the core fiber and forms the second laser beam.

15. A laser welding device, designed for carrying out a method of deep welding a workpiece, the method comprising:
   guiding a first laser beam and a second laser beam in a multicore fiber having at least one core fiber and a ring fiber, wherein the first laser beam is guided in the ring fiber and the second laser beam is guided in the core fiber, and the first and second laser beams exit from a fiber end of the multicore fiber before the workpiece,
   directing the first and second laser beams by a common optical unit onto the workpiece, wherein the common optical unit comprises a collimation lens and a focusing lens;
   imaging the fiber end with the common optical unit in a common focus on or in the workpiece,
   irradiating a surface of the workpiece using the first laser beam and the second laser beam, wherein, in a workpiece surface plane, a first beam width B1 of the first laser beam is greater than a second beam width B2 of the second laser beam, and wherein the second laser beam is directed onto an area of the workpiece surface plane within an area of the workpiece surface plane onto which the first laser beam is directed,
   wherein an intensity of the first laser beam alone is sufficient to produce a keyhole in the workpiece and the keyhole produced in the workpiece has a capillary width KB in the workpiece surface plane, wherein KB is substantially equal to B1, and B2<0.75*KB, wherein BPP1 is a beam parameter product (BPP) of the first laser beam and BPP2 is a beam parameter product of the second laser beam, wherein BPP1>BPP2, and wherein a high BPP represents a low beam quality.

16. The method of claim 15, wherein BPP1>2*BPP2.

17. The method of claim 15, wherein BPP1>4*BPP2.

18. A method for deep welding a workpiece, the method comprising:
   irradiating a surface of the workpiece using a first laser beam and a second laser beam,
   wherein, in a workpiece surface plane, a first beam width B1 of the first laser beam is greater than a second beam width B2 of the second laser beam, and wherein the second laser beam is directed onto an area of the workpiece surface plane within an area of the workpiece surface plane onto which the first laser beam is directed,
   wherein an intensity of the first laser beam alone is sufficient to produce a keyhole in the workpiece and the keyhole produced in the workpiece has a capillary width KB in the workpiece surface plane, wherein KB is substantially equal to B1, and B2<0.75*KB, and
   wherein a first focusing angle W1 of the first laser beam is less than or equal to a second focusing angle W2 of the second laser beam.

19. The method of claim 18, wherein the second laser beam has a better beam quality than the first laser beam.

20. The method of claim 18, further comprising:
   guiding the first and second laser beams in a two-in-one fiber having a core fiber and a ring fiber, wherein the first laser beam is guided in the ring fiber and the second laser beam is guided in the core fiber, and the first and second laser beams exit from a fiber end of the two-in-one fiber before the workpiece;
   directing the first and second laser beams by a common optical unit onto the workpiece; and
   imaging the fiber end with the common optical unit in a common focus on or in the workpiece, wherein the common optical unit comprises a collimation lens and a focusing lens.

21. The method of claim 1, wherein BPP1>4*BPP2.

22. A laser welding device, designed for carrying out a method of deep welding a workpiece, the method comprising:
   irradiating a surface of the workpiece using a first laser beam and a second laser beam,
   wherein, in a workpiece surface plane, a first beam width B1 of the first laser beam is greater than a second beam width B2 of the second laser beam, and wherein the second laser beam is directed onto an area of the workpiece surface plane within an area of the workpiece surface plane onto which the first laser beam is directed,
   wherein an intensity of the first laser beam alone is sufficient to produce a keyhole in the workpiece and the keyhole produced in the workpiece has a capillary width KB in the workpiece surface plane, wherein KB is substantially equal to B1, and B2<0.75*KB, and
   wherein a first focusing angle W1 of the first laser beam is less than or equal to a second focusing angle W2 of the second laser beam.

* * * * *